United States Patent [19]

Leininger et al.

[11] 4,110,832

[45] Aug. 29, 1978

[54] CARRY SAVE ADDER

[75] Inventors: Joel Calvin Leininger; George Phillips Taylor, both of Boca Raton, Fla.

[73] Assignee: International Business Machines Corporation, Armonk, N.Y.

[21] Appl. No.: 792,082

[22] Filed: Apr. 28, 1977

[51] Int. Cl.² .............................................. G06F 7/50
[52] U.S. Cl. .................................................... 364/786
[58] Field of Search ........................ 235/164, 173, 175; 364/786

[56] References Cited

U.S. PATENT DOCUMENTS

| | | | |
|---|---|---|---|
| 3,340,388 | 9/1967 | Earle | 235/175 X |
| 3,515,344 | 6/1970 | Goldschmidt et al. | 235/175 |
| 3,621,218 | 11/1971 | Nishimoto | 235/164 |

*Primary Examiner*—Jerry Smith
*Attorney, Agent, or Firm*—Charles P. Boberg

[57] ABSTRACT

This carry save adder (CSA) utilizes a pair of edge-triggered flip-flops as output manifesting elements at each CSA bit position, one of these flip-flops being the "sum trigger" which registers the half-sum value (herein called the "sum bit"), and the other flip-flop of the pair being the "carry trigger" which registers the carry value resulting from the binary addition performed by the CSA at that bit position. Each trigger has a latch portion for storing a sum or carry bit value that can be set or changed only at the leading edge of a clock pulse, being stable in the period between clock pulses. A latched sum or carry output bit value at any CSA bit position can be re-entered at any time as input to the same bit position or another CSA bit position, depending upon the operation to be performed (add, left or right shift, or complement). Each trigger also produces an unlatched output sum or carry value known as a "presum" or "precarry" bit. These unlatched bit values may be utilized for trial or test purposes, such as inputs to a lookahead logic network for determining whether a proposed complemental subtraction in a division operation can or cannot be successfully performed.

9 Claims, 10 Drawing Figures

FIG. 1

FIG. 2
RIGHT SHIFT

SHIFT SUM R1 AND CARRY L0

FIG. 3
LEFT SHIFT

SHIFT SUM L1 AND CARRY L2

FIG. 4
NORMAL ADD

SHIFT CARRY L1 AND SUM L0

FIG. 5
LOOKAHEAD ADD

FIG. 6 CARRY SAVE ADDER (CSA) BIT POSITION N

FIG. 7 CSA BIT POSITION N

CARRY SAVE ADDER

CROSS-REFERENCE TO RELATED APPLICATIONS

Copending application, Ser. No. 792,078, filed of even data herewith, by R. E. Birney, J. C. Leininger and G. P. Taylor, entitled "Divider Using Carry Save Adder with Nonperforming Lookahead", assigned to the assignee herein, discloses the carry save adder of the present invention embodied in apparatus for performing division, and it claims such an adder in combination with lookahead logic circuitry of a kind needed for accomplishing the purpose of that invention.

Copending application, Ser. No. 792,085, filed of even date herewith, by R. N. Ames, D. K. Hardin, J. C. Leininger and G. P. Taylor, entitled "System of Microcoded Data Processors Having Synchronous Microcode Generated Interface", assigned to the assignee herein, describes and claims the interface between a central processor and a floating point processor in which the present invention has been embodied.

The present application also is related to the following other applications assigned to the assignee herein, each of which was filed on Apr. 30, 1976:

| Serial No. | Title | Inventor(s) |
| --- | --- | --- |
| 681,953 now U.S. Pat. No. 4,047,161 issued Sept. 6, 1977 | Task Management Apparatus | M.I. Davis |
| 682,002 now U.S. Pat. No. 4,041,462 issued Aug. 9, 1977 | Data Processing System Featuring Subroutine Linkage Operations using Hardware Controlled Stacks | M.I. Davis G.W. Mayes T.S. McDermott L.E. Wise |
| 681,983 now U.S. Pat. No. 4,038,641 issued July 26, 1977 | Common Polling Logic for Input/Output Interrupt or Cycle Steal Data Transfer Requests | M.A. Bouknecht D.G. Bourke L.P. Vergari |
| 682,229 now U.S. Pat. No. 4,038,662 issued July 26, 1977 | Input/Output Interface Logic for Concurrent Operations | M.A. Bouknecht M.I. Davis L.P. Vergari |

Each of the foregoing applications is incorporated herein by reference as if it were set forth herein in its entirety.

BACKGROUND OF THE INVENTION

A carry save adder (CSA) is distinguished from other types of adders by the fact that the carry bits and half-sum bits which result from each addition are not immediately combined or consolidated but instead are saved separately from each other for subsequent use in the next addition performed by the CSA, the inputs to which will comprise the saved carry and half-sum bits (the latter hereinafter referred to simply as "sum bits" for convenience) and the bits of an operand which is being added to, or in some instances being effectively subtracted from, the value jointly represented by these saved carry and sum bits.

Carry save adders commonly are employed in high-speed multipliers, where they generally are able to function more rapidly than "carry propagate" or "ripple carry" adders because a carry save adder does not completely perform the relatively time-consuming process of combining carries with sum bits between successive additions in the multiplication process but instead defers this task until the final cycle of the multiplying operation. It has been proposed also to use a carry save adder in dividing operations, as disclosed in the above-identified application of R. E. Birney et al, Ser. No. 792,078, the advantage of this proposal being that it enables a combination multiplier-divider unit to be provided with a single adder of the CSA type for use in both multiplying and dividing operations.

As they generally are employed, carry save adders have a disadvantage that has detracted from their utility despite the above-described speed advantage which they offer. There are many instances during the performance of adding, complementing and column shifting functions where a carry or sum bit manifested at the output side of any order or bit position in the adder must be re-entered as input to that same order or bit position in the adder. Because of this re-entrancy requirement, it has been customary to provide carry save adders in duplicate and operate the pair of adders in alternation so that an output bit from any order or position in one adder of the pair may, if necessary, be applied as input to the corresponding order or position in the other adder of the pair, without thereby causing an undesirable interaction between an output bit and its re-entered counterpart at the same CSA bit position. This duplication of adder equipment introduces a cost consideration which must be weighed against the speed consideration in a conventional CSA installation. While it is desirable to eliminate the use of duplicate adder equipment and employ a single CSA having only one ordered set of bit positions for achieving the results described above, this must be accomplished without impairing the ability of the CSA to perform all of the functions required of it. In particular, some way must be provided for handling the re-entrancy problem where there is no duplicate set of CSA bit positions available for that purpose.

Where a carry save adder is being used as part of a divider apparatus, as proposed in the aforesaid Birney et al. application, there is an additional requirement that the CSA must provide information that can be used in a lookahead logic network to determine beforehand from the various CSA output values whether or not each proposed complemental subtraction in the division process may be successfully performed without causing an overdraft. For this purpose each CSA bit position must provide two types of output bits —(1) latched sum and carry output bits which can be set or changed only at predetermined clock times, being stable at all other times, and (2) unlatched sum and carry bits (hereinafter referred to as "presum" and "precarry" bits), whose respective values at every instant will be determined by the instantaneous values of the current inputs to that CSA bit position, the latter being used in making the trial determinations to prevent the occurrence of overdrafts. The conventional carry save adder cannot provide both latched and unlatched outputs from the same bit cell.

SUMMARY OF THE INVENTION

A prime object of the invention is to enable arithmetic operations of the kind described above to be accomplished with a single carry save adder of economical and compact design.

An important feature of the carry save adder herein disclosed is the use of edge-triggered flip-flops as the output elements of the adder. Each bit position of the adder contains two of these edge-triggered flip-flops (also referred to herein as "edge triggers" or simply as "triggers"), one of these being a sum trigger for manifesting sum bit values, and the other being a carry trigger for manifesting carry bit values. Each of these triggers has a latch portion for storing an output bit the value of which can be set or changed only at the leading edge of a clock pulse, being stable or unchangeable in the interval between successive clock pulses. The trigger also has a portion from which an unlatched output bit is manifested, the value of such bit depending upon the values of the inputs currently being applied to that CSA bit position and being changeable at any time in response to changes of such input values. Either of the latched sum and carry output bit values of a CSA bit position may be applied as input to the same or any other CSA bit position without disturbing such output value. The unlatched sum and carry output bit values of each CSA bit position, respectively designated herein as "presum" and "precarry" values, are generated in response to inputs comprising latched sum and carry bits from selected CSA bit positions plus an operand bit (if an operand is involved, or a dummy zero bit otherwise). The presum and precarry bits from the various CSA bit positions are available for use as inputs to divider lookahead logic circuitry which can perform trial or test functions to determine in advance whether or not any proposed complemental subtraction in the division process is capable of being performed without an overdraft, and therefore whether such proposed subtraction should actually be performed or skipped.

The foregoing and other objects, features and advantages of the invention will be apparent from the following more particular description of a preferred embodiment of the invention, as illustrated in the accompanying drawings.

DETAILED DESCRIPTION OF A PREFERRED EMBODIMENT

Figure 1:
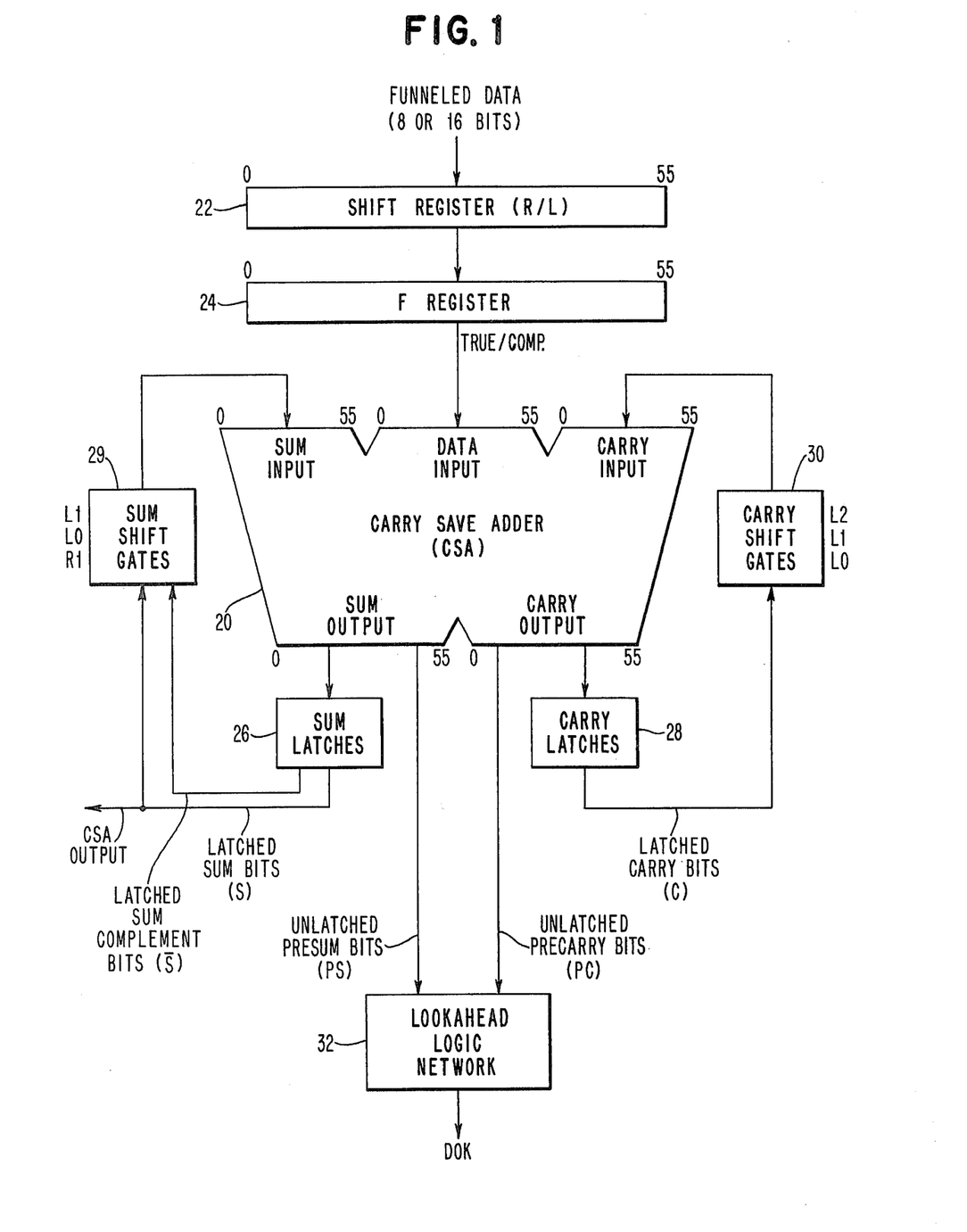
FIG. 1 is a diagram showing the general data flow paths in a processor of a type in which the carry save adder of the invention may be utilized.

FIG. 1 shows in block diagram form a portion of an arithmetic apparatus utilizing the present carry save adder (CSA) 20. The adder has been represented in partially disassembled fashion in this view to enhance the clarity of its showing. In practice the arithmetic apparatus schematically represented in FIG. 1 has been incorporated in a floating point processor which utilizes the same adder 20 in the performance of multiplying, dividing and other arithmetic operations, such versatility being imparted to the CSA 20 by the novel features subsequently described herein, some of which are indicated in FIG. 1. Parts of the floating point processor that are not germane to the present invention have been omitted from this showing. In this connection it should be understood that the present invention is not limited in its application to floating point processors. The principles of the invention could be usefully employed in other types of processors as well.

In the particular processor under consideration, incoming data is funneled eight or sixteen bits at a time into a 56-bit shift register 22, which assembles the bits in their proper order starting from the highest-order bit position, designated 0 at the extreme left end, and progressing through the lower orders whose respective ranks are inversely related to the numbers of their bit positions. The full range of 56 bit positions is actively utilized only when operating in a double-precision mode.

The number stored in the shift register 22 is in due course transferred to a so-called "F register" 24, from whence it may be transferred in true or complement form to the data input terminals of the CSA 20. In a division process, for example, the dividend is entered into the CSA 20 in ones-complement form at the beginning of the operation, and the divisor is held in the F register 24. As the division process is carried out, the initial dividend value is progressively reduced by complemental subtraction of the divisor therefrom, in the manner to be described, thereby forming a succession of partial remainder values of dimishing magnitudes. In a multiplying operation, the multiplicand is stored in the F register 24 and is repeatedly added to the partial product which is being built up in the CSA 20, as determined by the digits of the multiplier. Addition and subtraction are simpler operations which will be considered only in an incidental manner herein.

As shown in FIG. 1, the carry save adder 20 is adapted to receive three types of inputs, namely, a sum input, a carry input and a data input. In some instances an input may comprise a string of zero bits. Three input strings are required, however, whether or not they represent significant values. The sum input is furnished by the sum output latches 26 (preferably part of the CSA 20, although shown separately therefrom in FIG. 1), which store the half-sum bits generated as the result of an addition performed by CSA 20. For convenience of description, these half-sum bits are herein referred to simply as "sum bits", and whenever this expression is used, it should be understood to mean sum bits which do not necessarily include the effects of carries generated by the addition and which in most instances are separate from such carries.

In similar fashion, the carry input to the CSA 20 is furnished by the carry output latches 28, which preferably are part of the CSA 20 although shown separately therefrom in FIG. 1. The carries generated by an addition are "saved"; that is to say, they are not immediately combined with the sum bits generated by that same addition. At least some of the carries generated in each cycle of a multiplying or dividing operation performed by the processor may be saved until the next cycle thereof. Whenever it is desired for any reason to combine carries with sum bits, these two sets of bits must be fed back into the CSA 20.

In many instances it is necessary that a string of output sum bits or output carry bits undergo a column shifting action before it re-enters the input side of the CSA. Shifting of the sum bit string is accomplished by sum shift gates 29 which, depending upon the circumstances, will effect a left shift or right shift of the sum bit string, or in some instances (as during an add or complement function) no shift at all. Shifting of the carry bit string is accomplished by the carry shift gates 30 which, depending upon circumstances, will shift the carry bit string left two bit positions, left one bit position, or not shift it at all. Shortly there will be described herein the different situations in which each of these actions may take place. In the embodiment herein disclosed, the shift gates 29 and 30 actually are part of the CSA 20, although shown separately therefrom in FIG. 1.

Whenever the F register 24 is gated to the data input terminals of the CSA 20 during the course of an arithmetic operation, it supplies as input thereto the data stored in this register as an operand to be added in with the sum and carry inputs. If it is not desired that this operand be entered into the CSA, the F register is degated from the CSA, and the data entry will be a string of dummy zeros under this condition.

Figure 6:
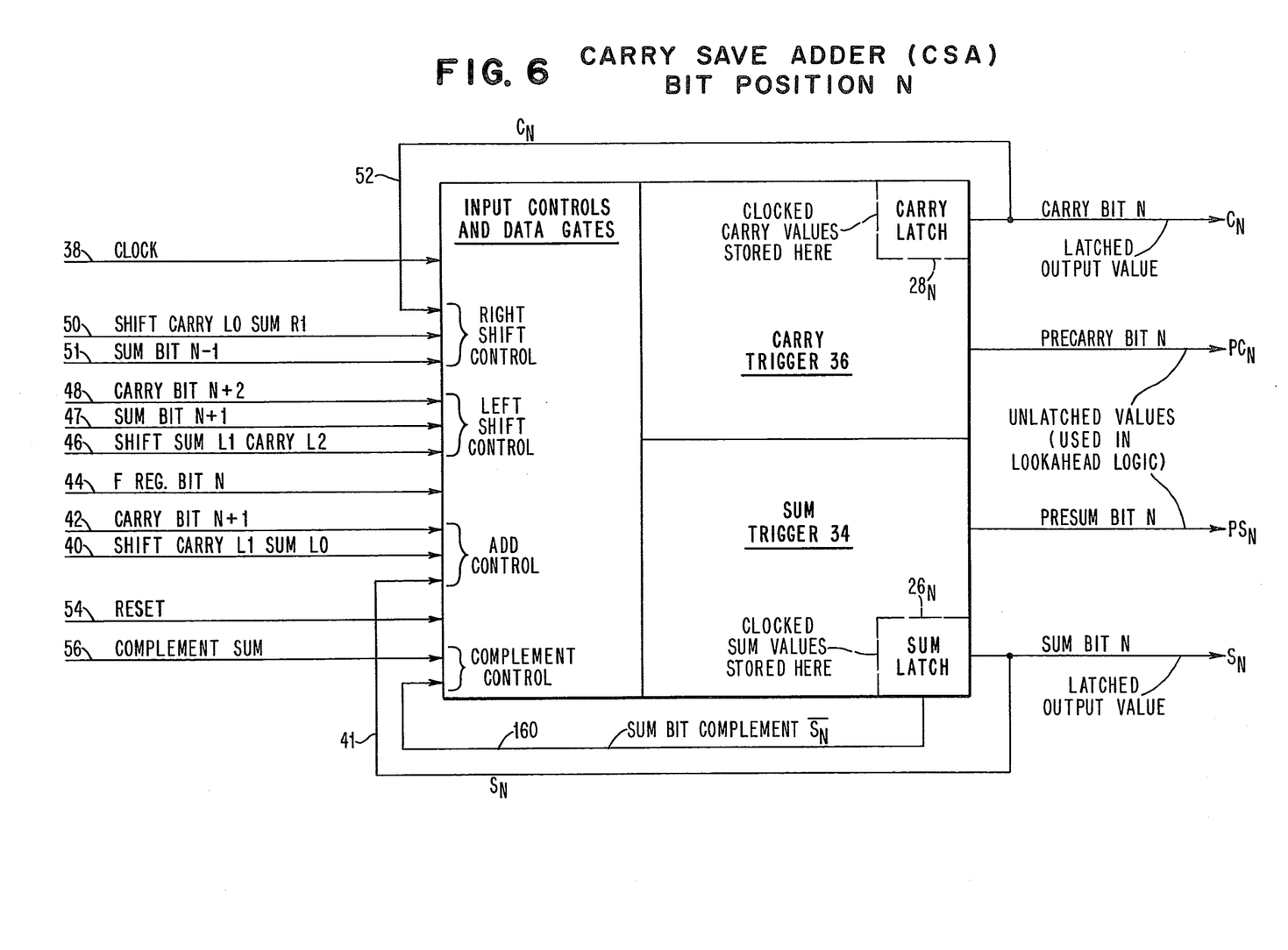
FIG. 6 is a general diagrammatic showing of a typical bit position in the carry save adder.
Figure 7:
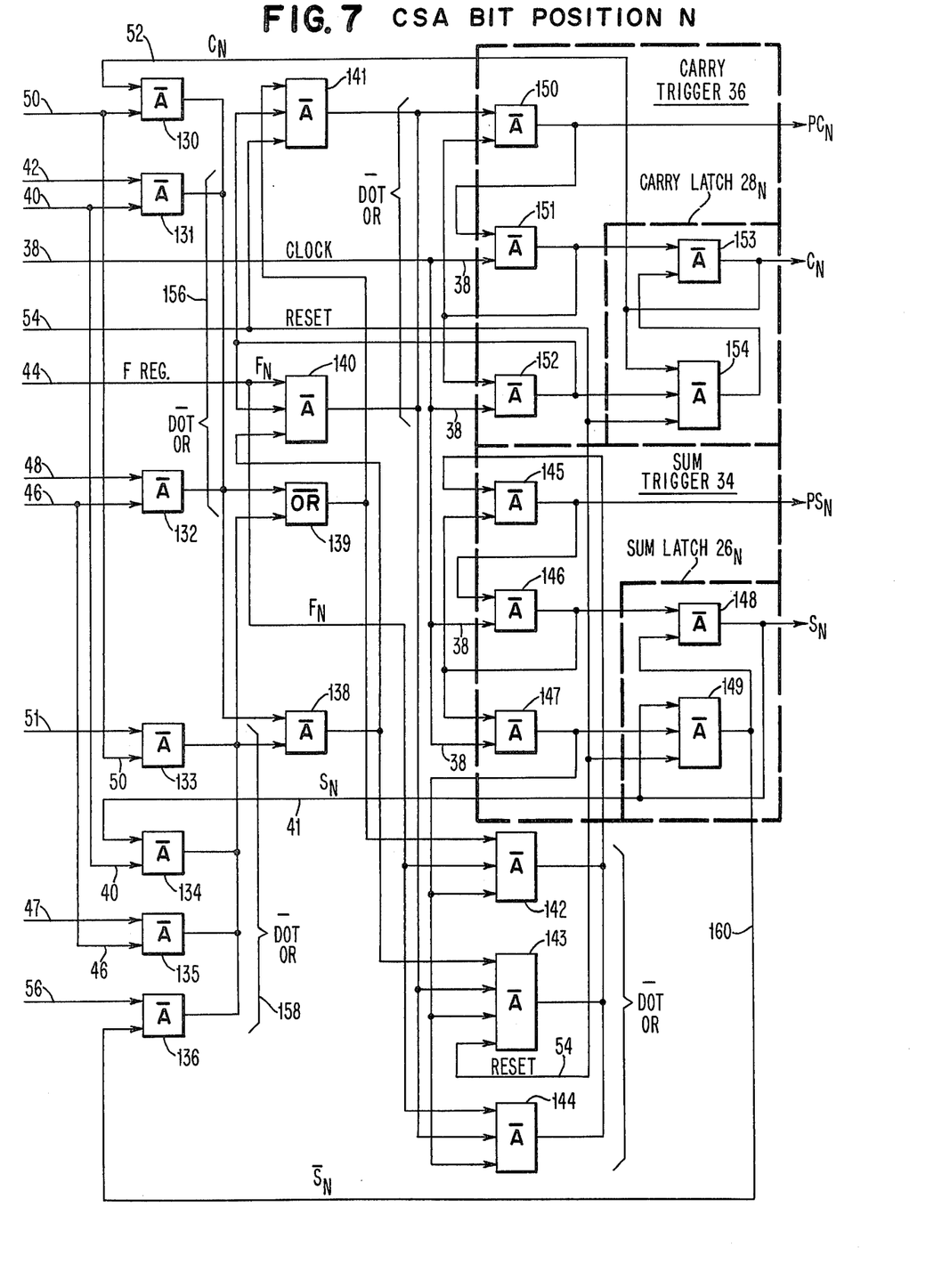
FIG. 7 is a logic diagram showing in greater detail the construction of the CSA bit position which is represented more generally in FIG. 6.

In FIG. 1 it has been indicated that the CSA 20 has a series of 56 bit positions, starting with the highest-order position 0 and ending with the lowest-order position 55, the numbering being inversely related to the order. FIGS. 6 and 7 respectively depict in block diagram and detailed circuit form the elements of a single bit position N in the CSA and the input/output conductors associated therewith. The same form of circuitry is provided at each of the other CSA bit positions. This circuitry will be described in detail presently.

It was mentioned above that the outputs of the CSA 20 will include sum bits that are latched and carry bits that are latched, and the CSA 20 also will furnish "presum" and "precarry" bits that are not latched, which is to say that the values of these presum and precarry bits may be changed under certain circumstances without altering the latched sum and carry values. In a dividing operation of the kind disclosed in the aforesaid Birney et al. application, these unlatched presum and precarry bits (designated "PS" and "PC", respectively, to distinguish them from the latched sum and carry bits, S and C) are fed to a lookahead logic network 32 which analyzes the presum and precarry bit patterns by a recursive logical process to determine whether the divisor in the F register 24 may be subtracted from the current value of the partial remainder without causing an overdraft.

The divide lookahead procedure will not be described in detail herein inasmuch as it is not germane to the present invention, which is concerned with the manner in which presum and precarry bits are produced by the CSA 20 for use in the lookahead network 32 rather than the manner in which they actually are used by this network. The output of the network 32 is a DOK signal which is a "1" bit if the subtraction can be performed without an overdraft. Such a condition is known as a "divide successful" state of the lookahead. An unsuccessful subtraction will be indicated by a DOK bit of 0.

Attention now will be given to the functions performed by the shift gates 29 and 30, FIG. 1, which as previously mentioned are actually incorporated into the structure of the CSA 20. Column shift functions may be required in several instances. In a divide operation, for example, if the respective magnitudes of the dividend and divisor are not in the proper relationship, the dividend will have to undergo a series of right shifts relative to the divisor to accomplish the necessary initial alignment of the operands. This occurs when the leftmost hexadecimal character of the true dividend value exceeds the leftmost or only significant hexadecimal character of the divisor, which requires that the dividend must be shifted to the right one hexadecimal position (i.e., four bit positions) relative to the divisor prior to the start of division. This function is known as "right alignment". There may be other instances where right shifting is required in order to align CSA output bits with the proper storage cell positions in memory, when the result of an arithmetic operation is to be stored.

When performed with a carry save adder, each right shift action requires that the sum (S) bits be shifted to the right one position without any shift of the carry (C) bits. This action is depicted on a small scale in FIG. 2, which represents the flow of data into and out of two adjoining CSA bit positions during a right shift. The legend "Shift Sum R1 and Carry L0" signifies that the sum bit in each CSA position, such as N−1, will transfer to the next higher-numbered (that is, next lower-ordered) position to the right, such as N. "L0" is the expression used herein to denote "no shift", and "Carry L0" means that the output carry bit from each CSA position will be fed back to the input side of that same CSA bit position. The F register is degated during a shift operation, so that a zero will be entered into the data input terminal of each CSA bit position. Thus, the inputs to each bit position during a right shift will consist of the sum bit from the next higher-ordered bit position (to the left), the carry bit from the present bit position and a zero data bit from the degated F register. These inputs are combined to provide new S and C outputs from each CSA bit position.

Left shifts are frequently required in multiplication and division operations and for other column alignment purposes. A left shift function, as partially represented in FIG. 3, involves a left shift by one position of the sum bit from each CSA position and a left shift by two positions of the carry bit from each CSA position. This action is denoted by the legend "Shift Sum L1 and Carry L2". During a left shift, therefore, each CSA bit position such as N receives as inputs the sum bit from the next lower position such as N+1 and the carry bit from the second lower position such as N+2, along with a zero data bit from the degated F register. These inputs are combined to provide new S and C output values from each CSA bit position.

Although right or left shifting is described herein as being accomplished one bit position at a time, it is contemplated also that multi-bit shifting may be performed, with the appropriate implementation.

Figure 4:
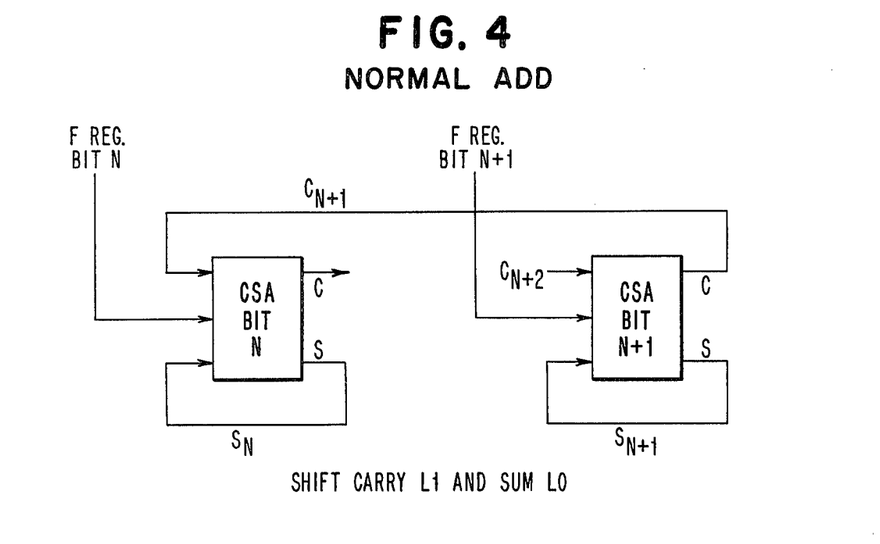

When a normal add function is to be performed, as partially represented in FIG. 4, the inputs to each CSA bit position such as N will consist of the sum bit S from that same position, the carry bit C from the next lower position such as N+1, and a data bit (that is, an operand bit) from the corresponding position of the F register. New S and C values are produced as the result of this addition, these new values being clocked and stored in the sum and carry latches, respectively (FIG. 1).

Figure 5:
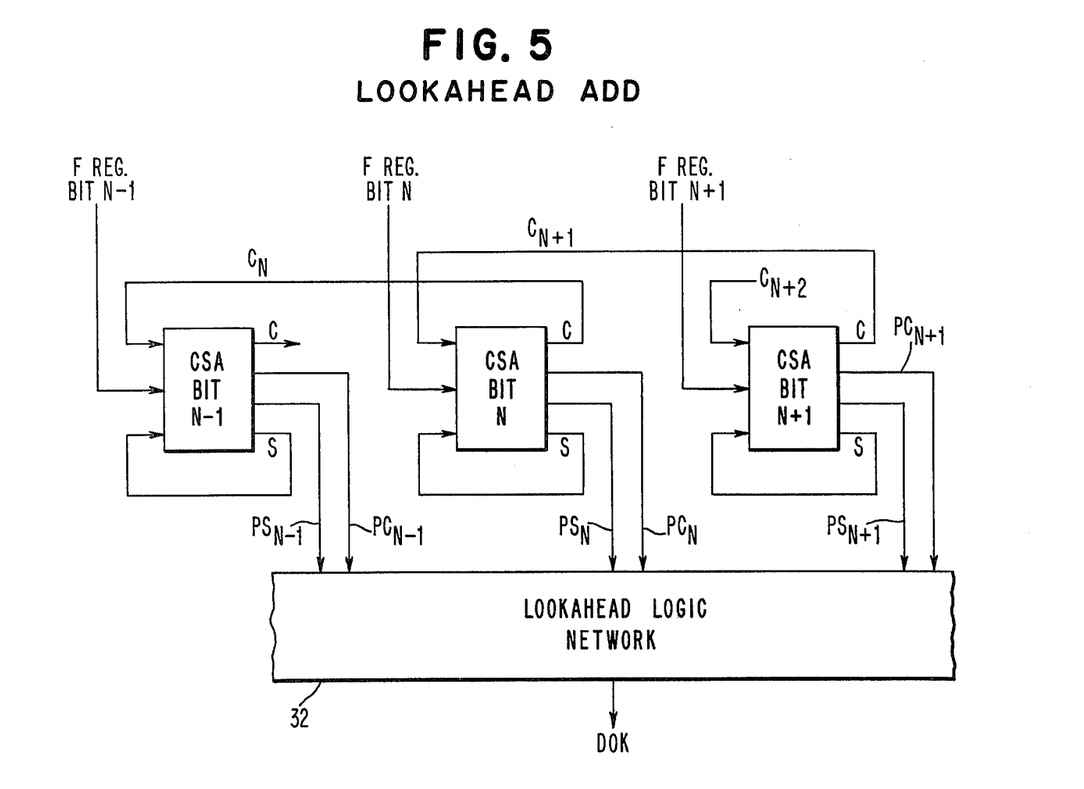

When a divide lookahead procedure is to be executed (as described in the aforesaid Birney et al application but not described herein), there is a preliminary step in which an add function is performed by the CSA 20. The useful outputs of this add function will be the "presum" (PS) and "precarry" (PC) bits, which are fed into the lookahead logic network 32 as shown in FIG. 5. The PS and PC values are not latched. However, the S and C values used as inputs to the CSA are latched and remain latched while the lookahead functions are being performed. The output of the network 32 is the DOK signal, which denotes by its 1 or 0 value whether the proposed subtraction could or could not be successfully performed. In a broad sense, the network 32 predicts whether or not any proposed subtraction can be accomplished by the adder without an overdraft. FIG. 6 shows in diagrammatic form the preferred construction of each bit position in the carry save adder 20, FIG. 1. (This construction will be described in more detail subsequently herein with reference to FIGS. 7-10). In each CSA bit position, FIG. 6, there are provided two D type edge-triggered flip-flops, otherwise referred to herein as "edge triggers" or simply as "triggers", one being the sum trigger 34, and the other being the carry trigger 36. Each of the triggers 34 and 36, FIG. 6, contains a latch circuit which will store a value in response to a clock pulse. Thus, the sum trigger 34 has a sum latch $26_N$ which is included among the group of sum latches generally designated 26 in FIG. 1. The carry trigger 36 has a carry latch $28_N$ which is included among the group of carry latches generally designated 28 in FIG. 1. The CSA bit positions also have certain input controls which include the shift gates generally designated 29 and 30 in FIG. 1.

The trigger circuitry in each bit position of the carry save adder is arranged so that whenever a clock pulse is applied thereto, the latch portion of each trigger is set in accordance with the data inputs to that trigger which exist at the rising edge of the clock pulse, that is, at the instant when the voltage of the "clock" line 38, FIG. 6, is switching from low level to high level. The latch does not respond to data inputs which occur at times other than those instants when the rising edges of the clock pulses occur. Hence, each latch will preserve the bit value stored therein at the leading edge of one clock pulse at least until the leading edge of the next clock pulse, regardless of how the inputs may change during the interim. Thus, the output sum (S) and carry (C) bit values which are stored in the latches 26 and 28, FIG. 1, are stable between clock pulses.

The sum and carry triggers 34 and 36, FIG. 6, also furnish unlatched output values in the form of presum and precarry bits. At the rising edge of each clock pulse these unlatched presum (PS) and precarry (PC) values are identical with the sum (S) and carry (C) values respectively stored in the sum and carry latches, but during the time which intervenes between successive clock pulses the PS and PC bits may change their values in response to input data changes, whereas the values of the S and C bit will remain fixed during that interval regardless of changes in the input data values. As already mentioned, the PS and PC bits are used in the lookahead processes that are performed by the logic network 32, FIG. 1, which is described in the Birney et al. application mentioned above.

Shift functions of the kind depicted in FIGS. 2-5 and described hereinabove are performed in response to the pulsing of certain lines leading to the input controls of each CSA bit position, FIG. 6. For example, when the CSA is to perform an add function (whether this is to be a normal addition as represented in FIG. 4 or an addition preceding a lookahead function as depicted in FIG. 5), a control line 40 designated "Shift Carry L1 Sum L0", FIG. 6, is energized. This conditions the circuitry in each bit position N of the CSA to receive a sum input over line 41 comprising the output sum bit $S_N$ furnished by the sum latch of that same CSA bit position N, together with a carry input over line 42 consisting of the carry bit from the output carry latch of CSA bit position N+1 (the next lower-order bit position). Depending upon conditions, there may or may not be a significant input from the N'th bit position of the F register over line 44 to the sum and carry triggers of the CSA bit position N. Where an operand is being added to, or effectively subtracted from, the value that currently is registered in the CSA, the F register is gated to the CSA. However, in those instances where addition is to be performed using sum and carry inputs only, without any significant input from the F register, then the F register is degated, thereby insuring that there will be a dummy (zero) input from the F register line 44 at each of the CSA bit positions.

Figure 2:
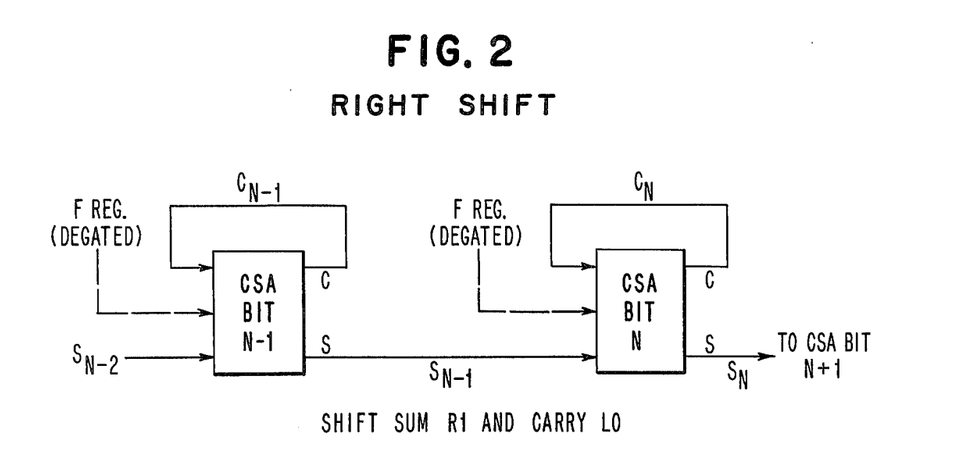
FIGS. 2-5 are simplified representations of the data flows involved in various shifting and adding functions which may be performed by the carry save adder (CSA) according to the invention.
Figure 3:
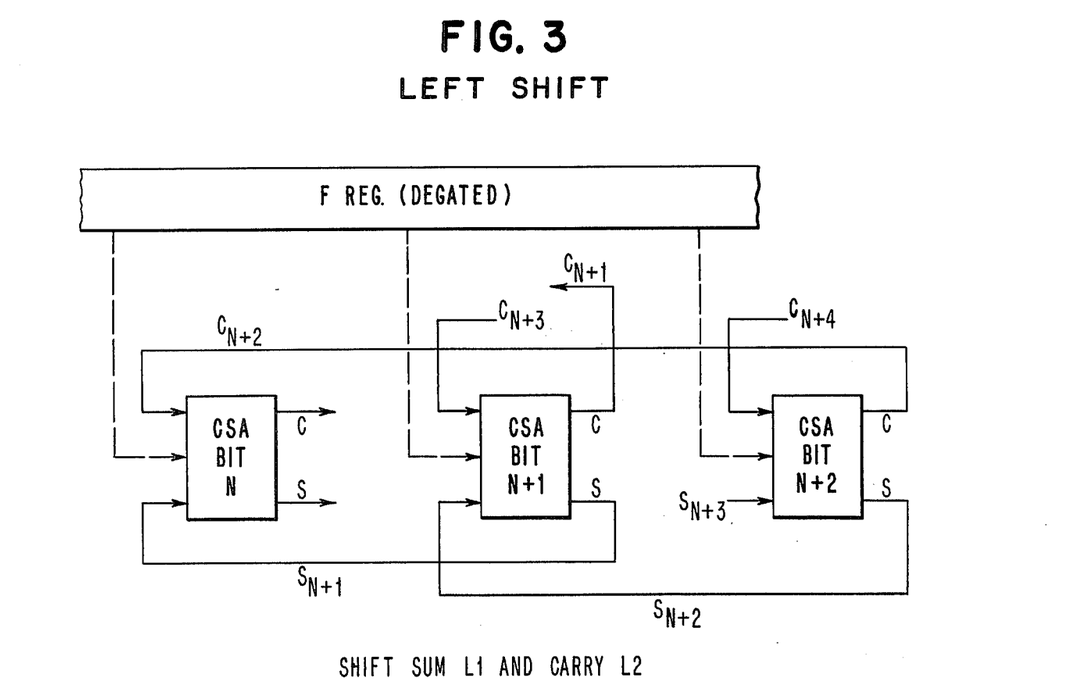

Column shift functions are performed as special types of add functions. When the CSA is required to execute a shift of its contents to the left, this is done by shifting all latched sum bits S to the left one bit position and concurrently shifting all latched carry bits C to the left two bit positions, then adding the coincident sum and carry bits at each CSA bit position to produce new S and C output bits, with the F register being degated at this time, as indicated in FIG. 3. To execute a left shift, the control line 46 designated "Shift Sum L1 Carry L2", FIG. 6, is energized. This conditions each CSA bit position N to receive as inputs thereto, over lines 47 and 48, respectively, the latched sum bit from CSA bit position N+1 and the latched carry bit from CSA bit position N+2. To execute a right shift, the control line 50, FIG. 6, designated "Shift Carry L0 Sum R1" is energized, causing each CSA bit position N to receive as inputs thereto over lines 51 and 52, respectively, the latched sum bit from CSA bit position N−1 (the next higher-order position) and the latched carry bit from the same bit position N, with the F register being degated at this time. This right shift action also is depicted in FIG. 2.

At times when it is necessary to reset the sum and carry triggers at each bit position of the CSA to a zero state, a reset line 54, FIG. 6, is energized. If for any reason it is desired to invert the value stored in the CSA, a "Complement Sum" line 56, FIG. 6, is energized, thereby converting the bits stored in the sum latches of the CSA to their ones-complement values. The sum latches 26 of the CSA, FIG. 1, store the final result of an arithmetic operation performed by this adder, with the carry latches 28 storing zeros at the end of the final cycle in the process.

The foregoing has been a rather condensed description of the manner in which the carry save adder operates under various conditions. The internal functioning of this adder now will be described in connection with the more detailed showing in FIGS. 7-10. Referring first to FIG. 7, it is seen that each bit position N of the CSA comprises 23 NAND gates and one NOR gate (respectively represented in the drawings by the symbols $\overline{A}$ and $\overline{OR}$). These 24 gates handle all of the add, shift, complement and other functions that may have to be performed by each of the CSA bit positions under various circumstances. As will be pointed out specifically hereinafter, some of these gates constitute elements of edge-triggered flip-flops comprising the sum trigger 34 and the carry trigger 36, FIG. 6, and others of these gates are included in various controls and data handling circuits that serve both the sum trigger and carry trigger circuits. The sum and carry latches $26_N$ and $28_N$ of the respective CSA bit position N comprise elements that serve as output gates of the edge triggers 34 and 36 and which are set to represent sum and carry bit values that are determined solely by inputs occurring in time coincidence with the leading edges of clock pulses applied on the control line 38. The latched sum (S) and carry (C) values normally are not subject to change in the interval between successive clock pulses, regardless of changes that may occur in the inputs to the CSA during that interval.

Other gates shown in FIG. 7 that are separate from the aforesaid latches provide the presum (PS) and precarry (PC) bits mentioned above, which may be generated coincidentally with or independently of the clock pulses on line 38 depending upon the particular conditions which prevail at the time. A change in the unlatched PS and PC values may occur between clock pulses without affecting the latched S and C values. The PS and PC values are manifested only so long as the inputs which generated them are still being applied to the CSA; hence, they are only temporarily generated values which must be utilized immediately if at all.

The CSA circuitry shown in FIG. 7 responds to various data inputs which are selected from among the types of inputs listed below according to the particular functions being performed by the CSA at the time:

| Input Line FIGS. 6 & 7 | Description of input |
| --- | --- |
| 41 | A sum input from the same order |
| 160 | An inverted sum input from the same order |
| 47 or 51 | A sum input from a different order |
| 52 | A carry input from the same order |
| 42 or 48 | A carry input from a different order |
| 44 | An operand input from the F register |
| 44 (degated) | Zero input from the F register |

Only certain ones of these inputs are utilized in the performance of any given CSA function, as explained hereinabove in connection with FIGS. 2-5.

Figure 8:
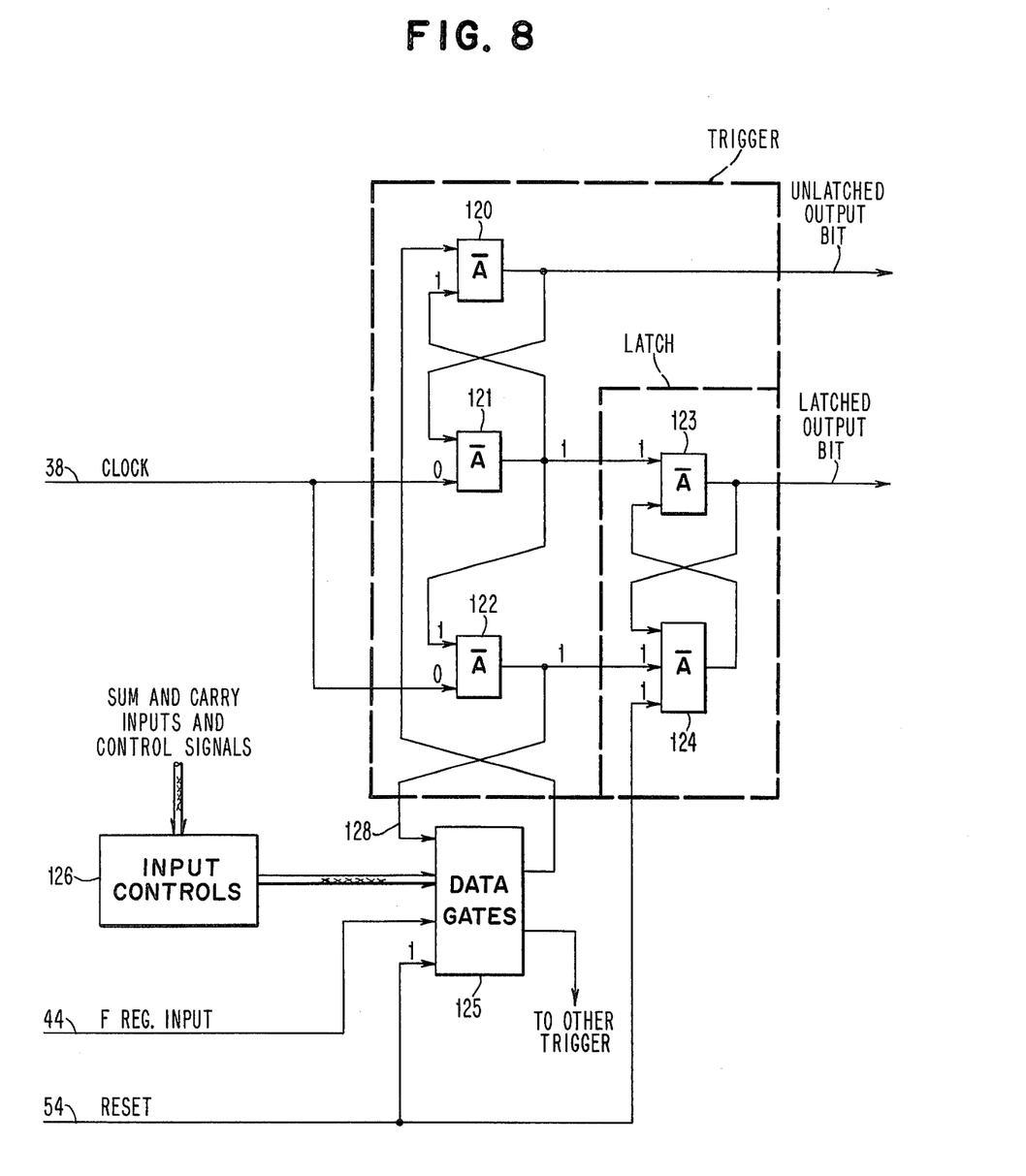
FIGS. 8-10 are simplified diagrams of the aforesaid CSA bit position showing various functions of the edge trigger circuitry employed therein.

Before commencing the detailed description of the CSA 20 as shown in FIG. 7, a more elementary description of this CSA circuitry will be given with reference to FIGS. 8, 9 and 10, which are concerned particularly with the edge triggers used in the CSA. FIG. 8 shows in simplified form the basic design of the edge trigger circuitry. Each of the sum and carry triggers 34 and 36 (FIGS. 6 and 7) includes an assemblage of NAND circuits such as 120 to 124, arranged as shown in FIG. 8. The data bit that is being entered into each trigger is supplied by a set of data gates 125, which perform certain logical processing operations upon the input data in accordance with the magnitudes of the respective input bits (sum input, carry input and the operand or F register input, if any). The sources from which the input data bits are obtained will depend upon the type of function that the CSA is to perform, and the selection of the data sources is made by the input controls 126 in response to the control signal which is currently in effect. For instance, if the active control signal is one that calls for a right shift, then the input bits to any given CSA position N will be a sum bit $S_{N-1}$, a carry bit $C_N$ and a zero operand (F register) bit. If the control signal calls for a left shift, the input bits then will be a sum bit $S_{N+1}$, a carry bit $C_{N+2}$, and no operand bit. If an Add operation (Shift Carry L1 Sum L0) is requested, then the chosen inputs are sum bit $S_N$, carry bit $C_{N+1}$ and an operand bit $F_N$ or no operand bit, according to the purpose of the addition. For a Complement Sum function, the only significant input is the complement of the sum bit $S_N$, the operand and carry input bits being zeros in this instance.

Once the choice of input data sources has been made by the input controls 126, FIG. 8, the data gates 125 process these input bits according to their values and without regard to their origins. The gates 125 produce several output bits, one of which represents, in inverted form, the Exclusive-OR function of the input bits and another of which represents, in inverted form, the AND function of the input bits. The complement of each of these bits is to be manifested as the output of the respective sum or carry trigger, the Exclusive-OR function being manifested by the sum trigger, and the AND function being manifested by the carry trigger. The description which follows is applicable in the case of either trigger. To serve the purpose of the invention, it is further required that each trigger manifest its output in both latched and unlatched modes, the latched output being stable between clock pulses while the unlatched output is subject to change between clock pulses.

In the normal quiescent state of the trigger circuitry, FIG. 8, with no clock pulse or reset pulse being applied, the clock line 38 supplies negative or logical 0 inputs to NAND gates 121 and 122, and the reset line 54 supplies positive or logical 1 inputs to NAND gates 124 and 125, as shown in FIG. 8 (the reset line going negative only when a reset of the trigger is to be accomplished). With clock inputs of 0, the gates 121 and 122 have logical 1 outputs. Gate 121 applies its 1 output as inputs to gates 120, 122 and 123.

Figure 9:
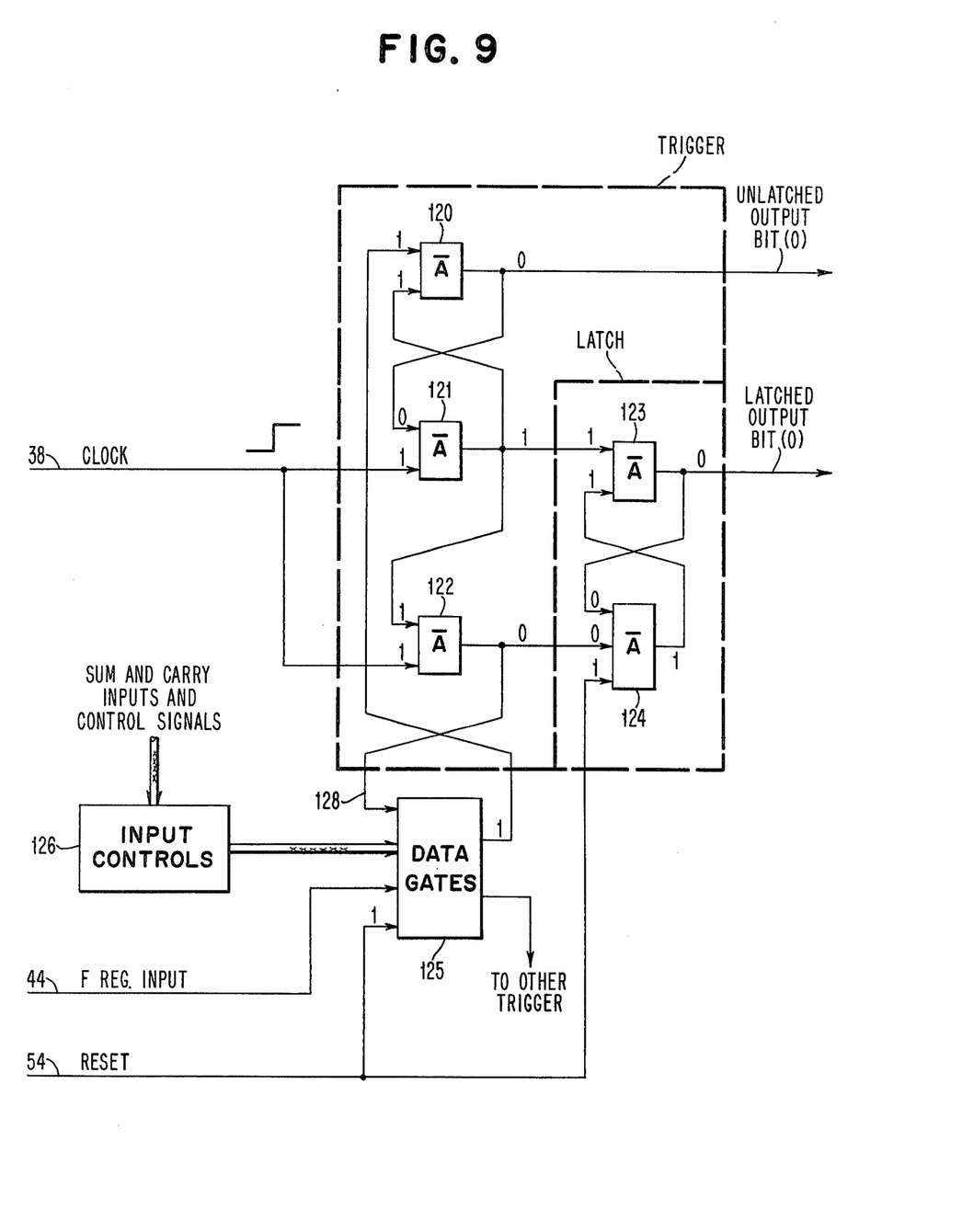

Now referring to FIG. 9, if a 1 bit appears at the output of data gates 125, it is applied as input to gate 120. With both of the inputs to NAND gate 120 being 1, the output of gate 120 goes to 0, thereby causing 0 to be manifested as the unlatched output bit. The 0 output of gate 120 also is applied as one of the inputs to gate 121, as shown in FIG. 9. When a clock pulse is applied to gates 121 and 122, the clock input goes to 1, with the result that now both of the inputs to gate 122 are 1's, FIG. 9. The output of gate 122 thereupon goes to 0, thus applying a 0 input to gate 124, which produces a 1 output that is applied as input to gate 123. Both of the inputs to gate 123 now being 1, the output of gate 123 is 0, and this is the latched output bit. Gates 123 and 124, being cross-coupled to each other, will maintain themselves in the states shown by FIG. 9 at least until the next clock pulse is applied to this trigger circuit, regardless of any changes that may occur in the value of the unlatched output bit during this interval. A connection 128 from the output of gate 122 to an appropriate point in the gate network 125 will momentarily inhibit any change in the output of gate network 125 while a 0 is being entered into the latch by gate 122.

Figure 10:
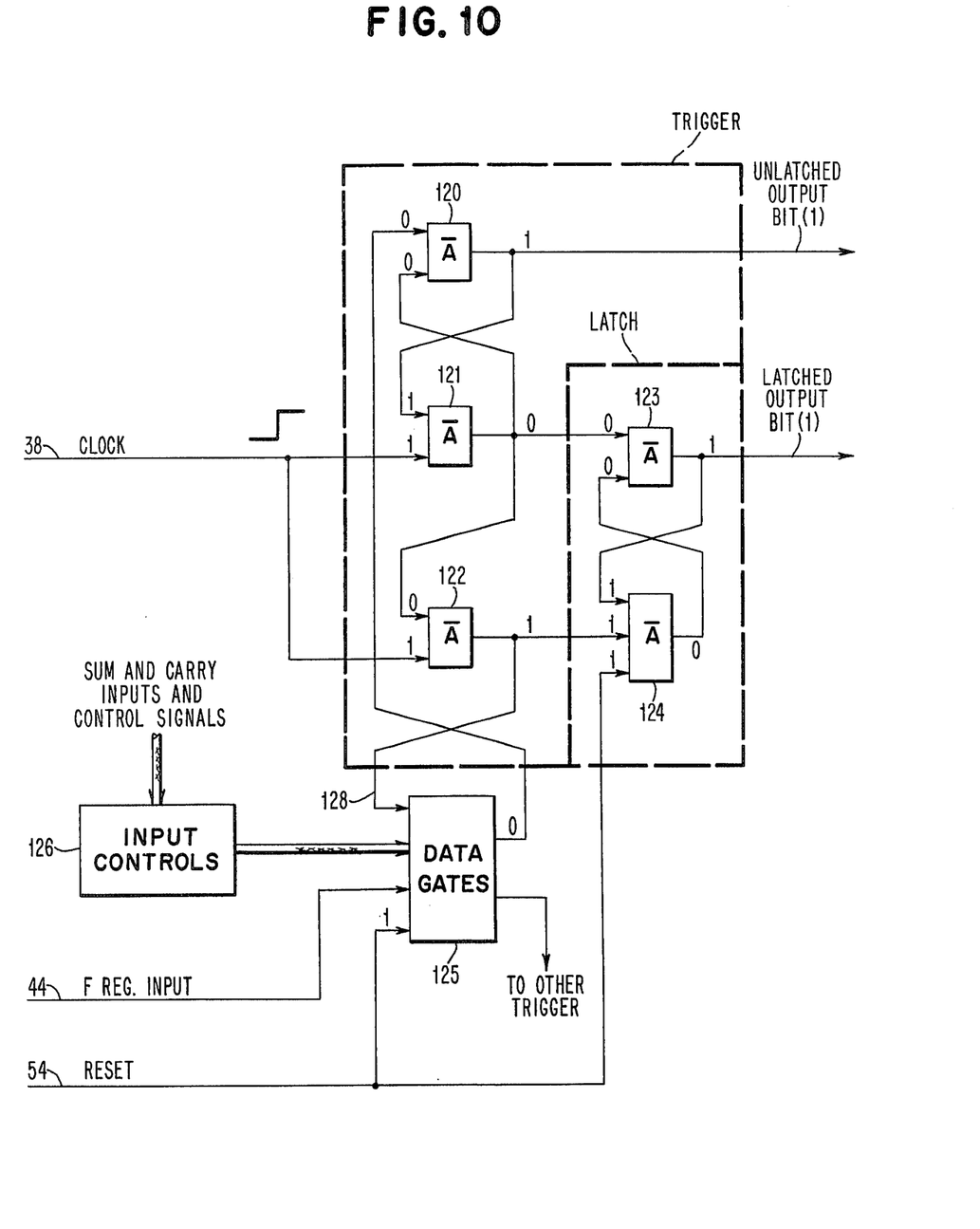

Now referring to FIG. 10, if a 0 appears at the output of data gates 125, it is applied as input to gate 120, thereby causing the output of this gate to be 1. Gate 120 thus produces an unlatched output bit of 1, and it also applies this 1 bit as input to gate 121, as shown in FIG. 10. When the clock line is pulsed, this applies a 1 clock input to gate 121, thereby causing both inputs to gate 121 to have 1 values, FIG. 10. The output of gate 121 therefore is 0, which is applied as input to gate 123, causing gate 123 to produce a latched output 1 bit. The 0 output from gate 121 also is applied as input to gate 122, causing the latter to have its normal 1 output, which enables gate 124 to assume a state complementing that of gate 123. The gates 123 and 124 maintain this stable state at least until the next clock pulse, despite any changes that may occur meantime in the value of the unlatched output bit.

The foregoing description explains how the triggers operate. Referring now to FIG. 7, the NAND gates 130-136 shown therein correspond to the input control section 126 of the CSA bit position as shown in FIG. 8. The gates 138-144, FIG. 7, correspond to the data gates 125, FIG. 8. The NAND gates 145-149, FIG. 7, provide a sum trigger circuit configuration functionally corresponding to that provided by the gates 120-124 in FIG. 8. The carry trigger circuit configuration comprising NAND gates 150-154, FIG. 7, similarly provides a counterpart of the one provided by gates 120-124 in FIG. 8.

No attempt will be made herein to describe in complete detail all of the actions that take place within the various parts of the complex circuitry shown in FIG. 7 under all possible conditions. However, certain key actions will be described, and the status of all the data gates and trigger gates will be tabularly presented for each of the possible combinations of input bits during the various functions performed by the CSA (add, right shift, left shift, complement). These presentations, when considered in connection with the explanations previously given hereinabove, will provide an adequate disclosure of the carry save adder operations. In presenting the description which follows, reference will be made primarily to FIG. 7 supplemented by incidental reference to FIG. 6.

Add

Add functions are performed with or without the F register gated to the CSA. If the F register is degated, there will be a zero input on the F register line 44, FIG. 7. Otherwise the line 44 will supply to the CSA bit position N an input bit $F_N$ from the N'th order of the operand stored in the F register.

To initiate an add operation, the control line 40 is energized. This conditions the NAND gates 131 and 134 to produce outputs which are the ones-complements of the carry bit $C_{N+1}$ on line 42 and the sum bit $S_N$ on line 41, respectively (see FIG. 6 also). The output of gate 131 is applied to one of the junctions of a negative DOT OR network 156, FIG. 7. A network of this kind is so constituted that if any input to the network is negative, the output of the network will be negative. In similar fashion the output of gate 134 is applied to one of the junctions of a negative DOT OR network 158. The two outputs of the DOT OR networks 156 and 158 are applied to a NOR gate 139 and also to a NAND gate 138. The arrangement is such that if the original sum and carry input bits have equal values, then the respective outputs of the gates 138 and 139 have equal values corresponding to those original input values. If the input sum and carry bits have different values, then the NAND gate 138 has a positive (1) output value, and the NOR gate 139 has a negative (0) output value.

Input from the F register line 44, FIG. 7, is applied to the data gates 140, 142 and 144 when the F register is gated to the CSA. If the F register is degated from the CSA, as in FIG. 2 or FIG. 3, the line 44 supplies dummy inputs of zero to these gates. During an add operation in which an operand is entered (FIG. 4 or FIG. 5) the F register line 44 supplies to each CSA bit position N the operand bit $F_N$ registered in the corresponding position N of the F register.

The input control gates 130, 132, 133, 135 and 136, FIG. 7, have passive roles during an add operation, as distinguished from a shift or complement function. Since the various control lines connected to these NAND gates are not energized in the present instance, these gates tend to have positive (1) outputs. However, if the input data bit that is fed to either one of the active gates 131 and 134 is a 1, then the output of this gate will be negative (0), causing the entire DOT OR network 156 or 158 (as the case may be) to go negative. Hence the inactive control gates 130, 132, 133, 135 and 136 are unable to affect the inputs that are supplied from the add control gates 131 and 134 to the NAND gate 138 and NOR gate 139.

Rather than describe all of the actions which take place within the various gates shown in FIG. 7 during an add operation, there will be presented below a table that shows the respective outputs furnished by the data gates 138-144, trigger gates 145-154 and DOT OR gates 156 and 158 for each possible combination of sum input, carry input and divisor input bits. Some of these states are represented as they are under the conditions which exist only when the clock pulse is being applied to the CSA, as noted on the chart. With some slight modifications, this same table also will serve to depict the gate actions for the other CSA functions (right and left shifts and complement-sum), as described hereinafter.

TABLE OF GATE OUTPUTS FOR ADD OPERATION-continued

| Inputs to CSA Bit Position N | | | | | | | | | |
|---|---|---|---|---|---|---|---|---|---|
| Sum Input | $(S_N)$ | 0 | 1 | 0 | 1 | 0 | 1 | 0 | 1 |
| Carry Input | $(C_{N+1})$ | 0 | 0 | 1 | 1 | 0 | 0 | 1 | 1 |
| Operand Input | $(F_N)$ | 0 | 0 | 0 | 0 | 1 | 1 | 1 | 1 |
| Gate Outputs | | | | | | | | | |
| | DOT OR 156 | 1 | 1 | 0 | 0 | 1 | 1 | 0 | 0 |
| | DOT OR 158 | 1 | 0 | 1 | 0 | 1 | 0 | 1 | 0 |
| | NAND 138 | 0 | 1 | 1 | 1 | 0 | 1 | 1 | 1 |
| | NOR 139 | 0 | 0 | 0 | 1 | 0 | 0 | 0 | 1 |
| | NAND 140 | 1 | 1 | 1 | 1 | 1 | 0 | 0 | 0 |
| | " 141 | 1 | 1 | 1 | 0 | 1 | 1 | 1 | 0 |
| | " 142 | 1 | 1 | 1 | 1 | 1 | 1 | 1 | 0 |
| | " 143 | 1 | 0 | 0 | 1 | 1 | 1 | 1 | 1 |
| | " 144 | 1 | 1 | 1 | 1 | 0 | 1 | 1 | 1 |
| $PS_N$ | " 145 | 0 | 1 | 1 | 0 | 1 | 0 | 0 | 1 |
| | " 146 | 1 | 0* | 0* | 1 | 0* | 1 | 1 | 0* |
| | " 147 | 0* | 1 | 1 | 0* | 1 | 0* | 0* | 1 |
| $S_N$ | " 148 | 0 | 1 | 1 | 0 | 1 | 0 | 0 | 1 |
| | " 149 | 1 | 0 | 0 | 1 | 0 | 1 | 1 | 0 |
| $PC_N$ | " 150 | 0 | 0 | 0 | 1 | 0 | 1 | 1 | 1 |
| | " 151 | 1 | 1 | 1 | 0* | 1 | 0* | 0* | 0* |
| | " 152 | 0* | 0* | 0* | 1 | 0* | 1 | 1 | 1 |
| $C_N$ | " 153 | 0 | 0 | 0 | 1 | 0 | 1 | 1 | 1 |
| | " 154 | 1 | 1 | 1 | 0 | 1 | 0 | 0 | 0 |

* Only at clocking time; otherwise 1.

The latch gates 148, 149, 153 and 154 which furnish the sum and carry outputs retain their settings after the clock pulse has terminated and the data inputs have been withdrawn. The trigger gates 145 and 150, which furnish the presum and precarry outputs for lookahead purposes, will return to all-zero output states when the data inputs are withdrawn, since it is not necessary that they maintain any significant outputs once the lookahead function has been accomplished. The trigger gates 146, 147, 151 and 152 return to all-1 output states when the clock pulse terminates.

Although the presum (PS) and precarry (PC) outputs of the adder have been described herein as having specific utility when used in a dividing operation to predict the outcomes of proposed subtractions, they may in general be viewed simply as adder outputs that are free to change instantaneously in response to changes in the adder inputs, whether or not such changes occur at a predefined clocking time.

Shift

Right and left shift operations are special types of add operations, which differ from the normal add operation described above only in that the sum and carry input bits are derived from different bit positions, and the operand input is always zero (F register degated). To execute a right shift, for instance (FIG. 2), the "Shift Carry L0 Sum R1" control line 50, FIGS. 6 and 7, is energized, thereby conditioning the NAND gate 130, FIG. 7, to furnish a negative (0) output if the carry input bit ($C_N$ in this case) is 1, or a positive (1) output if $C_N$ is 0. Similarly, the energization of control line 50 also conditions NAND gate 133 to produce a 0 output if the sum input bit ($S_{N-1}$) is 1, or vice versa. Any zero output bit or bits produced by gates 130 and 133 will be passed by the negative DOT OR networks 156 and/or 158 to the NOR gate 139 and/or NAND gate 138. From here on, the data gates and trigger gates function in the same way as described previously to produce the final presum ($PS_N$), precarry ($PC_N$), sum ($S_N$) and carry ($C_N$) output bits from the CSA bit position N now being considered.

The "Table of Gate Outputs for Add Operation" presented hereinabove is also applicable to a right shift operation, provided the following modifications are made in this table:

a. The sum input bit in this instance is $S_{N-1}$ rather than $S_N$, and the carry input bit is $C_N$ rather than $C_{N+1}$.

b. Any columns containing input bit combinations in which the operand bit ($F_N$) is 1 should be disregarded, since they are inapplicable to the shift operation here being considered.

The sum and carry output bits produced by this right shift action are clocked into the sum and carry latches.

A left shift (FIG. 3) is executed by energizing the "Shift Carry L1 Sum L2" control line 46, FIGS. 6 and 7, thereby conditioning the NAND gate 132, FIG. 7, to produce a 0 output if the carry input bit ($C_{N+2}$ in this case) is 1, or a 1 output if $C_{N+2}$ is zero. Energization of line 46 also conditions NAND gate 135 to produce a 0 output if the sum input bit ($S_{N+1}$) is 1, or otherwise producing a 1 output. Any zero (i.e., negative) output bit or bits produced by gates 132 and 135 will be passed by the negative DOT OR networks 156 and/or 158 to the NAND gate 138 and NOR gate 139. From this point on the functioning of the data gates and trigger gates is the same as described previously for an add operation, provided the following modifications are made in the above "Table of Gate Outputs for Add Operations":

a. The sum input bit in this instance is $S_{N+1}$ rather than $S_N$, and the carry input bit is $C_{N+2}$ rather than $C_{N+1}$.

b. Any columns containing input combinations in which the divisor bit $F_N$ is 1 should be disregarded.

The sum and carry output bits produced by this left shift action are clocked into the sum and carry latches.

Complement Sum

As mentioned hereinabove, there may be occasions when it is desired to obtain the complement of the complement of registered in the sum latches 26 of the CSA at the conclusion of an arithmetic operation. When this result is desired, the "Complement Sum" control line 56, FIGS. 6 and 7, is energized. This conditions the NAND gate 136, FIG. 7, of each CSA bit position N to produce an output which is the inverted form of the complemental sum bit $\overline{S_N}$ then registered in the sum latch $26_N$ of the respective CSA bit position. This complemental sum bit is fed from the output of latch gate 149, FIG. 7 (which stores the complement of $S_N$) through a line 160 to the sum input terminal of gate 136. The output of gate 136, which represents the value of the sum bit $S_N$ then stored in the sum latch, is fed through the DOT OR network to the gates 138 and 139.

In a sum complementing operation, there is no significant carry input or operand input. Since the carry input is zero, the output of the DOT OR network 156 is 1, which is applied to gates 138 and 139 for thereby conditioning these gates in such fashion that when the value of $S_N$ is zero, gate 138 produces a 1 output and gate 138 produces a 0 output, but when the value of $S_N$ is 1, gate 138 produces a 0 output while gate 139 produces a 1 output. As the end result, the output value that eventually is clocked into the sum latch $26_N$ is the complement of the sum bit $S_N$ that previously had been stored there.

The outputs of the data gates and trigger gates, FIG. 7, when a Complement Sum function is being performed by the CSA can be represented by the above "Table of Gate Outputs for Add Operation" provided this table is modified as follows:

a. All columns in which the carry input and/or operand input is 1 should be disregarded.

b. In each of the remaining two columns, the sum input is the complement of the sum bit $S_N$ initially registered in the sum latch.

Reset

During a reset, the control line 54 is pulsed negatively, thereby causing each of the NAND gates 141, 143, 149 and 154, FIG. 7, to assume a state in which it manifests a positive (1) output, if it has not already been put into that state. Such actions in turn cause the NAND gates 148 and 153 to assume their "output 0" states, thus resetting all sum and carry latches, and it also insures that the NAND gates 145 and 150 likewise are in states where they will manifest zero presum and precarry outputs.

Propagation of Carries

At the end of a multiplying or dividing operation involving a series of additions or complemental subtractions, if there are any carries standing in the carry latches 28, they may be combined with the sum bits standing in the sum latches 26, if desired, by a carry propagation adding operation, which is similar to a normal add function, FIG. 4, except that the F register now is degated so that dummy zeros are substituted for the operand digits that otherwise would be fed to the CSA bit positions. If one of these carry propagate additions does not reduce the contents of the carry latches to all-zero status, then the step is repeated as many times as necessary until the carry latches register all zeros, at which time the sum latches register the final product in the case of a multiplying operation, or the final remainder (if that should be desired) in the case of a dividing operation. Partial carry propagations also may be performed at intermediate steps of the multiplying or dividing operation, if sufficient time is allowed in the machine cycle to accomplish this.

Summary of Advantages

The disclosed carry save adder is able to perform add, left shift, right shift and complement-sum functions using only one ordered set of bit positions. This is possible by virtue of the fact that edge triggers 34 and 36 respectively including sum and carry latch portions 26 and 28 are employed as sum and carry output manifesting elements, whereby a latched output bit from any bit position may be applied as input to the same bit position or to any other bit position in the same set without causing the latched output bit to change, except at a subsequent clock time when such change is desired. The edge triggers 34 and 36 also have other portions (gates 145 and 150, FIG. 7) which furnish unlatched presum and precarry output bits whose values may change in response to changed inputs at times other than clock times without disturbing the latched sum and carry outputs. This enables the processor to test a proposed complemental subtraction, for example, to determine in advance whether the result would be valid and therefore whether such result should or should not be set into the sum and carry latches at the next clock time. The adder construction herein disclosed provides an economical, compact and highly versatile arithmetic unit, and in practice it has been used in a microprogrammed floating point processor of very compact design capable of being mounted upon a single card.

While the invention has been particularly shown and described with reference to the preferred embodiment thereof, it will be understood by those skilled in the art that various changes in form and details may be made therein without departing from the spirit and scope of the invention.

What is claimed is:

1. In an arithmetic processing apparatus which can perform various operations including addition and column shifting in response to control signals selectively applied thereto, said apparatus containing a source of gated clock pulses for timing such operations and a binary register for storing the bits of an operand to be used in certain of said operations, a carry save adder for use in said apparatus comprising an ordered set of bit positions each capable of receiving at least three binary inputs and producing sum and carry output bits as logical functions thereof, each of said adder bit positions including as output elements thereof a pair of edge triggers which are respectively adapted to manifest sum and carry bits produced by the respective bit position, each of said triggers including a latch which is settable in response to adder inputs that coincide with a gated clock pulse and being capable of retaining such setting during the interval between successive clock pulses irrespective of input values that may be received by said adder during such interval, each latch thereby storing and manifesting as its output a clocked sum bit or a clocked carry bit as the case may be, and input controls operable in response to applied control signals for conditioning each of said adder bit positions to receive inputs which include selected ones of the sum and carry bits manifested by the latches at the same adder bit position and/or another or others of said adder bit positions according to the particular operation selected by the applied control signal, the arrangement of said input controls being such that one of the output sum and carry bits manifested by the latches at the bit position in any given order of said ordered set is applied directly as input to a bit position in an adjacent order, if any, of the same ordered set, while the other of said output bits is applied directly as input to a bit position in an order, if any, which is adjacent to the first-mentioned adjacent order of said set, whereby the next subsequently applied clock pulse will cause the sum and carry latches of each adder bit position to be set in accordance with inputs then being applied to such bit position including one or more inputs from bit positions in the same ordered set.

2. A carry save adder as recited in claim 1 wherein said input controls include add gate means effective when a control signal requiring addition of said operand to the contents of said adder is applied to said apparatus for conditioning each of said adder bit positions to receive among its binary inputs a sum bit currently stored by the sum latch at the same adder bit position, plus an operand bit furnished by the bit position in the corresponding order of said register, plus a carry bit currently stored by the carry latch in the adder bit position of next lower order, if any.

3. A carry save adder as recited in claim 1 wherein said input controls include right shift gate means effective when a control signal requiring a right shift of the adder contents is applied to said apparatus for conditioning each of said adder bit positions to receive among its binary inputs a carry bit currently stored by the carry latch at the same adder bit position, plus a dummy bit in lieu of the operand bit registered in the corresponding order of said register, plus a sum bit currently stored by the sum latch in the adder bit position of next higher order, if any.

4. A carry save adder as recited in claim 1 wherein said input controls include left shift gate means effective when a control signal requiring a left shift of the adder contents is applied to said apparatus for conditioning each of said adder bit positions to receive among its binary inputs a sum bit currently stored by the sum latch in the adder bit position of next lower order, if any, plus a carry bit currently stored by the carry latch in the adder bit position of second lower order, if any, plus a dummy bit in lieu of the operand bit registered in the corresponding order of said register.

5. A carry save adder as recited in claim 1 wherein said input controls include gate means effective when a control signal requiring a propagation of carries is applied to said apparatus for conditioning each of said adder bit positions to receive among its binary inputs a sum bit currently stored by the sum latch at the same adder bit position, plus a carry bit currently stored by the carry latch in the adder bit position of next lower order, if any, plus a dummy bit in lieu of the operand bit registered in the current order of said register.

6. A carry save adder as recited in claim 1 wherein each of said sum latches has portions thereof which respectively manifest true and complement values of the sum bit stored in that latch, said input controls including gate means effective when a control signal requiring that the sum bits stored in the sum latches of said adder be converted to their respective complements is applied to said apparatus for conditioning each of said adder bit positions to receive among its binary inputs the sum complement bit currently manifested by the sum latch at the same bit position and dummy bits at all other inputs thereto, whereby a succeeding clock pulse will cause all of said sum latches to be set for storing a sum value which is the inverse of the sum value previously stored therein.

7. A carry save adder as recited in claim 1 wherein each of said triggers includes a portion apart from the latch portion of such trigger for manifesting an unlatched output bit whose value at each instant is determined solely by the instantaneous values of the inputs then being received by the respective adder bit position, whether or not a clock pulse is present, thereby enabling said apparatus to ascertain the tentative result of a proposed arithmetic operation without necessarily causing such result to be clocked into said latches.

8. In an apparatus of the kind specified by claim 7 which is capable of performing division by complemental subtractions and which includes a lookahead logic unit for determining whether or not a proposed complemental subtraction involving the inputs to said unit can be successfully performed, means for applying the unlatched output bits manifested by the triggers of the respective bit positions to said lookahead logic unit for thereby enabling said unit to ascertain whether or not a subtraction involving the current inputs to said adder can be successfully performed.

9. A carry save adder as recited in claim 1 wherein said input controls include shift gate means effective when a control signal requiring a shift of the adder contents is applied to said apparatus for conditioning each particular one of said adder bit positions to receive among its binary inputs a sum bit stored by a sum latch at an adder bit position which has a predetermined ordered relationship to said particular bit position, if such a sum latch exists, plus a carry bit stored by a carry latch at an adder bit position which has another ordered relationship to said particular bit position, if such a carry latch exists, plus a dummy bit in lieu of the operand bit registered in the corresponding order of said register.

* * * * *

UNITED STATES PATENT AND TRADEMARK OFFICE
CERTIFICATE OF CORRECTION

PATENT NO. : 4,110,832
DATED : August 29, 1978
INVENTOR(S) : LEININGER ET AL

It is certified that error appears in the above-identified patent and that said Letters Patent are hereby corrected as shown below:

Column 1, line 38, of the table, "now U.S. Pat. No. 4,038,662" should read --now U.S. Pat. No. 4,038,642--.

Column 14, lines 4 & 5, "complement of the complement of registered" should read --complement of the number registered--.

Column 14, line 24, "gate 138" (second occurrence) should read --gate 139--.

Signed and Sealed this

Twenty-fourth Day of April 1979

[SEAL]

Attest:

RUTH C. MASON
Attesting Officer

DONALD W. BANNER
Commissioner of Patents and Trademarks